United States Patent
Yoon et al.

(10) Patent No.: US 7,379,195 B2
(45) Date of Patent: May 27, 2008

(54) DEVICE FOR THE DETECTION OF AN OBJECT ON A VEHICLE SEAT

(75) Inventors: Jason Jeong-Suk Yoon, Seoul (KR); Stefan Weidhaas, Munich (DE); Michael Bauer, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/713,699

(22) Filed: Mar. 5, 2007

(65) Prior Publication Data
US 2007/0206836 A1 Sep. 6, 2007

Related U.S. Application Data

(63) Continuation of application No. PCT/EP2005/005462, filed on May 20, 2005.

(30) Foreign Application Priority Data
Sep. 6, 2004 (DE) .................. 10 2004 043 418

(51) Int. Cl.
G01B 11/14 (2006.01)
(52) U.S. Cl. .................................... 356/625
(58) Field of Classification Search ............ None
See application file for complete search history.

(56) References Cited

U.S. PATENT DOCUMENTS

| | | |
|---|---|---|
| 5,737,083 A | 4/1998 | Owechko et al. |
| 6,480,616 B1 | 11/2002 | Hata et al. |
| 7,102,683 B2 * | 9/2006 | Perry et al. .............. 348/370 |
| 2002/0181743 A1 | 12/2002 | Khairallah et al. |
| 2003/0179083 A1 | 9/2003 | Wallace et al. |
| 2004/0109154 A1 | 6/2004 | Wallace et al. |

FOREIGN PATENT DOCUMENTS

| | | |
|---|---|---|
| EP | 1 039 314 A2 | 9/2000 |
| FR | 2 815 134 A1 | 4/2002 |

OTHER PUBLICATIONS

International Preliminary Report on Patentability and Written Opinion in PCT/EP2005/005462 dated Mar. 6, 2007.
International Search Report dated Aug. 16, 2005 (Three (3) pages).

* cited by examiner

*Primary Examiner*—Tu T Nguyen
(74) *Attorney, Agent, or Firm*—Crowell & Moring LLP

(57) ABSTRACT

A device for the detection of an object on a vehicle seat, including a camera and a processing unit for the generation of a two-dimensional representation of the object is provided. The device also includes at least two illumination sources, which are positioned in such a manner that the object can be illuminated from different directions, and the processing unit is suitable to generate a three-dimensional representation of the object from two dimensional representations, each generated under different illumination conditions.

8 Claims, 8 Drawing Sheets

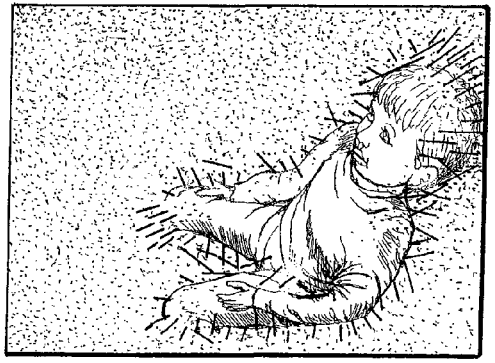
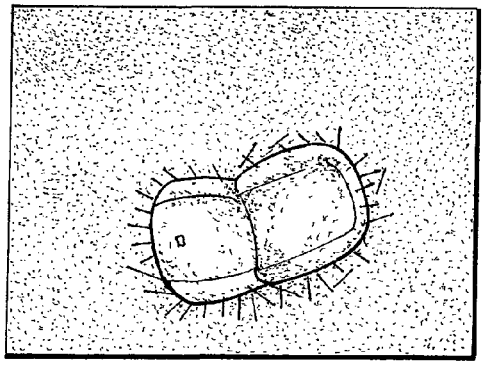
Fig.4a  Fig.4b
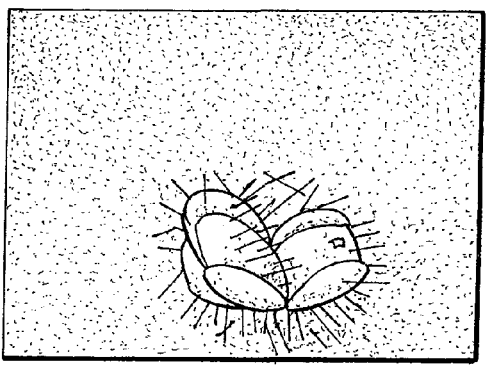
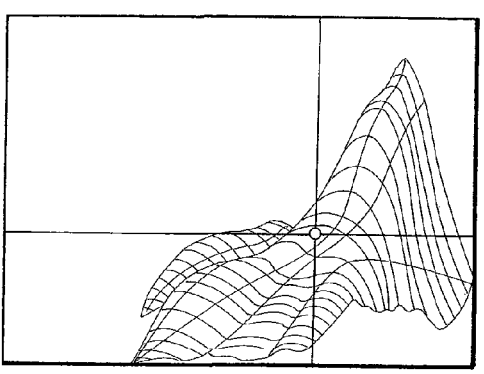
Fig.4c  Fig.4d
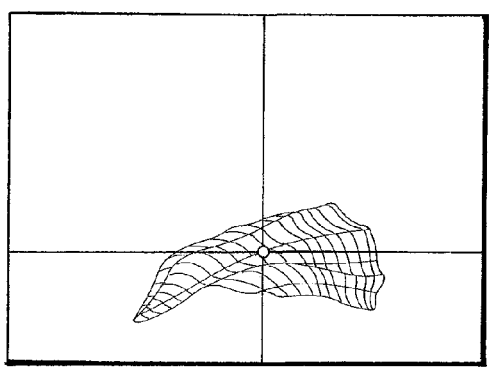
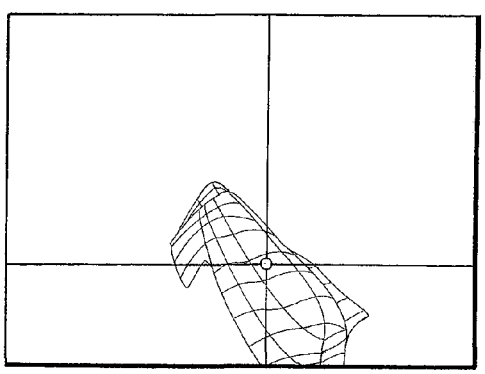
Fig.4e  Fig.4f

DEVICE FOR THE DETECTION OF AN OBJECT ON A VEHICLE SEAT

CROSS REFERENCE TO RELATED APPLICATIONS

This application is a continuation of PCT International Application No. PCT/EP2005/005462, filed May 20, 2005, which claims priority under 35 U.S.C. § 119 to German Patent Application No. 10 2004 043 418.2 filed Sep. 6, 2004, the entire disclosures of which are herein expressly incorporated by reference.

BACKGROUND AND SUMMARY OF THE INVENTION

Exemplary embodiments of the invention relate to a device that detects an object on a vehicle seat, comprising a camera and a processing unit that generates a two-dimensional representation of the object.

There are various techniques and systems for detecting, identifying or classifying the occupants of a motorized vehicle. Furthermore, there are various techniques for the recognition of the head position of vehicle occupants. Information from such techniques mainly serves as data for the adaptation of occupant restraint systems to the type, size, or seat position of the occupants.

According to the Federal Motor Vehicle Safety Standard (FMVSS) 208 set out by U.S National Highway Transportation and Safety Administration (NHSTA), starting with the 2006 model year nearly 100 percent of all automobiles sold in the US must have the ability to automatically control the deploying power of airbags based on crash severity, occupant type, and size, as well as on seat belt usage. As manufacturers began to develop various occupant detection systems, vision techniques have attracted much attention due to their superior adaptability to various vehicle cabin environments as compared to other mechatronic methods.

In recent years, a number of optical approaches have been studied to resolve the airbag suppression decision problem. These studies can be classified into two categories depending on the number of cameras used in the system. In the earlier versions of occupant detection systems, single camera approaches were in demand due to the high cost of imaging sensors. However, such monocular systems did not provide sufficient 3D information necessary for functions such as the out-of-position detection, which is a supplementary task guaranteeing low risk deployment according to the position/pose of the passenger. As a consequence, the majority of occupant detection systems became more dependent on stereo vision techniques that use two cameras. Faced with the increasing demand for various vision-based in-vehicle applications, the growing number of cameras employed has come under serious scrutiny.

In the following, some of the most important drawbacks of existing optical approaches to occupant detection are enumerated.

Stereo camera systems use more than one camera, and multiple cameras significantly increase the hardware cost.

Many approaches use supplementary light sources for illuminating the vehicle interior, which increases the hardware cost as well.

Due to the theoretical limitation of stereo vision, two cameras must be adjacent to each other, which makes it difficult to design a compact system module.

Stereo vision systems are extremely sensitive to any physical impacts distorting the geometry of the involved cameras.

Since the 3D reconstruction of most stereo vision techniques is essentially based on a texture correspondence matching, most stereo vision approaches fail to reconstruct the shape of a target object when the object does not have textures on its surface.

To obtain a satisfactory depth resolution, most stereo vision techniques employ sub-pixel spatial resolution which increases the overall system cost by requiring wider data bandwidth as well as faster computing power.

Intensive searching and triangulation processes, which are essential for stereo vision, influence the system cost.

Most stereo vision techniques require complicated camera calibration.

Exemplary embodiments of the present invention provide a single camera system able to generate 3D information of a vehicle seat occupant, which can be achieved using minimal supplementary active illumination.

Exemplary embodiments of the present invention provide a device that detects an object on a vehicle seat, comprising a camera and a processing unit that generates a two-dimensional representation of the object. The device also comprises at least two illumination sources, which are positioned in such a manner that the object can be illuminated from different directions, and the processing unit can generate a three-dimensional representation of the object from two two-dimensional representations, each generated under different illumination conditions.

Typically, a device according to the present invention comprises a single camera by which an image sequence is captured. Different illumination conditions can be caused by dimming, switching, or movement (displacement and/or rotation) of the illumination sources. For simplicity, according to an exemplary embodiment of the present invention, different illumination conditions are caused by switching the illumination sources on and off, i.e., different illumination conditions are caused by different combinations of active illumination sources, particularly by a different number of active illumination sources.

In accordance with one exemplary embodiment of the present invention the processing unit can generate a three-dimensional representation of the object from two two-dimensional representations, each generated under different illumination conditions, whereby the different illumination conditions are caused by a different number of active illumination sources. The generation of a three-dimensional representation from two two-dimensional representations can include a generation from more than two two-dimensional representations.

An occupant detection system according to the present invention can classify an object in a vehicle for facilitating the airbag control module. Classification can be carried out based on object features which are extracted from the original images and/or from the three-dimensional object representation and/or from intermediate results. The classification can be used to assign the object to a target occupant class.

According to an exemplary embodiment of the present invention, the number of target occupant classes in such a classification is limited. The target occupant classes are reduced to three classes being a front facing child seat, a rear facing child seat and an adult.

Therefore, an exemplary embodiment of the present invention includes a processing unit that can assign the detected object to one out of at least two object classes, where the at least two object classes are selected from a plurality of object classes comprising the three following object classes:

a child-seat arranged in forward driving direction,
a child-seat arranged in backward driving direction,
an adult.

The result of the object classification can be used to simplify other tasks. For this purpose, the result can be signaled to another task.

According to an exemplary embodiment of the present invention, the processing unit signals the object class to which the device on the vehicle seat has been assigned to a task, which is executed either by the processing unit itself or by another device, whereby the fact and/or manner of the execution of this task depends on the object class to which the device on the vehicle seat has been assigned. Particularly, according to an exemplary embodiment of the present invention an out-of-position detection is only activated, if the object is classified as an adult.

In a method according to the present invention, different illumination conditions within an image sequence are generated by at least two light sources. Ambient illumination fluctuations and/or shadows are eliminated.

According to an exemplary embodiment of the present invention ambient illumination fluctuations in the image sequence are eliminated by a so-called Double flash technique.

A shadowless image can be composed from the image sequence by simulating a virtual light source having an infinite extent. This is suitably achieved by a so-called ShadowFlash technique.

The boundary information of an object in the resulting shadowless image can be extracted and the 3D surface of the object can be reconstructed.

Finally, according to an exemplary embodiment of the present invention, a multi-dimensional feature vector is defined and is utilized for classification purposes. The feature vector can use 2D and/or 3D information.

By the present invention a novel framework for a vehicle occupant detection system is provided. The performance of a device according to the present invention is comparable to stereo vision systems. Thus, a device according to the present invention can serve as an alternative solution to binocular vision systems offering some substantial advantages.

A device according to the present invention is economical compared to stereo vision techniques, since only a single camera is needed. The market price of the required switchable illumination sources is usually lower than that of a camera.

Compared to stereo vision approaches less computing power is necessary for a device and/or method according to the present invention. The complexity of the algorithms used in the proposed system is normally lower than the complexity of any stereo vision algorithm.

Since the proposed system is not based on texture correspondence matching, the performance of the 3D reconstruction is completely independent of the textural property of a target object.

The degree of freedom for locating the camera and light sources is much higher than with most stereo vision techniques.

In a method according to the present invention the depth resolution is only a function of the spatial resolution of the camera. Therefore, no sub-pixel imaging is necessary.

The complexity, in particular the hardware complexity, of a system according to the present invention is normally lower than the complexity of a system based on stereo vision.

Other objects, advantages and novel features of the present invention will become apparent from the following detailed description of the invention when considered in conjunction with the accompanying drawings.

BRIEF DESCRIPTION OF THE DRAWINGS

FIGS. 4a-c illustrate needle maps of the surface normals and their recovered 3D surfaces projected along the z-axis in which needle maps superimposed on their original images.

FIGS. 4d-f illustrates needle maps of the surface normals and their recovered 3D surfaces projected along the z-axis in which surface reconstruction results with the spread axes.

DETAILED DESCRIPTION OF THE DRAWINGS

Figure 1A:
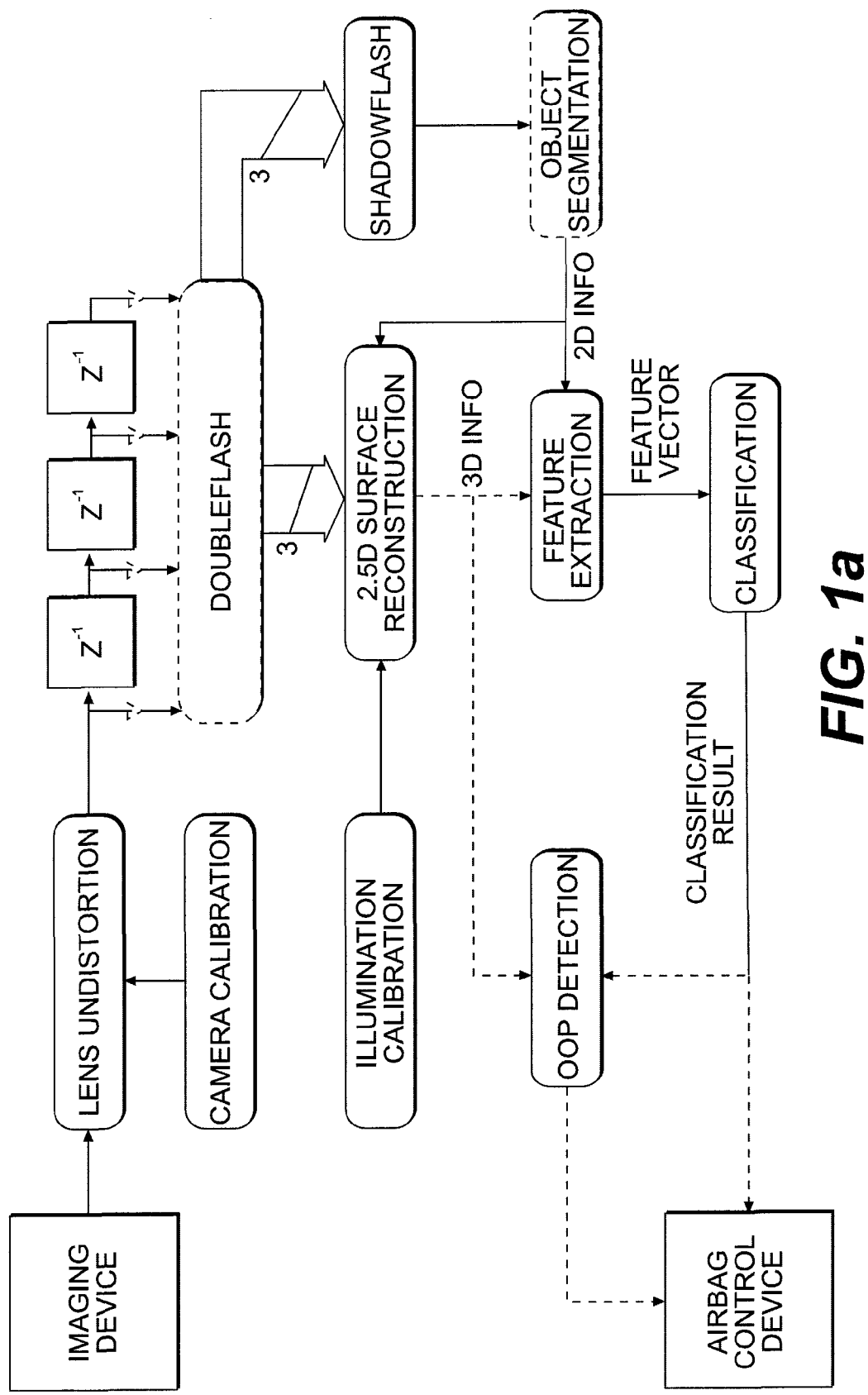
FIG. 1a is a system overview of a basic framework of a system according to the present invention.

FIG. 1a shows a basic framework of a system according to the present invention, i.e., the structure of the system in conjunction with the out-of-position detection system. It is assumed that the classification results may be shared with the out-of-position (OOP) detection system as shown in the state transition diagram FIG. 1b, which describes the state transition between two systems. The OOP detection is activated only if the object is classified as an adult. The class 'adult' is the only class continuously observed after the classification. The transition 'Event' in FIG. 1b occurs when any dramatic change occurs in the field of view, such as any abrupt change of classes.

First, the applied image acquisition and pre-processing techniques are described.

A 12-bit high dynamic ranged monochrome-imaging sensor with the resolution of 256-by-256 at 15 Hz is employed for image capture. Three infrared light sources triggered by a 2-bit gray code signal are used, flashing in sequential order. The gray code signal is also synchronised with the trigger clock in the imaging sensor so that each frame is captured under the preassigned illumination conditions. Accordingly, four types of images having different illumination are consecutively obtained during the acquisition: three images by each light source (plus ambient illumination) and one with only ambient illumination.

Illumination stabilization is achieved by the so-called Double flash technique. Mainstream CCD-based and most of the emerging CMOS-based image sensors do not provide sufficient optical dynamic range for monitoring the interior of a vehicle where people experience extreme variations of illumination either spatially or temporally. In order to capture images without losing image details in such an environment, it is essential to employ an imager suitable to the high dynamic range and/or a novel approach to decrease the dynamic range without varying illumination offset. The Double flash technique is employed in the system, which combines the advantages of offset reduction and dynamic range compression by illuminating two input images with different radiant intensities. The Double flash technique has originally been introduced in C. Koch, S. Park, T. J. Ellis, and A. Georgiadis: "Illumination Technique for Optical Dynamic Range Compression and Offset Reduction." in British Machine Vision Conference (BMVC01), pages 293-302, Manchester, England, September 2001, BMVA Press, which is herein expressly incorporated by reference.

After eliminating lens distortions, the image sequence is delivered to the Double flash module which eliminates the ambient illumination fluctuations by subtracting two images exposed to different illumination powers. Being facilitated by a three-stage delay buffer, the Double flash method completely removes the ambient illumination and produces three images per clock cycle.

Shadow removal is achieved by the so-called Shadow-Flash technique.

Nearly all vehicle interior monitoring applications introduce supplementary light sources (usually in the near-infrared region) in order to attain an appropriate illumination offset. Therefore, strong cast shadows are unavoidable in the field of view. Shadows often bring out erroneous segmentations causing false detection of imaginary objects, which hinders the overall performance of a system. The Shadow-Flash technique, originally introduced in PCT International Application Publication No. WO 2004/040515 A1, which is herein expressly incorporated by reference, is a suitable method to eliminate shadows by simulation of a virtual light source of infinite size. The algorithm uses multiple images where each image is flashed from a different direction. The number of necessary input images $N_{in}$ to create one shadowless image is equal to the number of employed light sources $n_{light}$ plus an additional image for calculating the ambient light suppression.

$$N_{in} = n_{light} + 1 \quad (1)$$

According to an exemplary embodiment of the present invention three light sources are used, making the number of inputs four, including ambient light. If the ambient illumination image $I_{offset}$ is negligible, the number of input images can be reduced to $n_{light}$ by ignoring the Double flash. However, then the robustness to deal with illumination change is lost.

Temporal domain processing is done by a sliding n-tuple strategy.

The ShadowFlash technique can be extended to the temporal domain by synchronizing the illumination sources with the trigger signal of an imager such that the imager produces a video sequence of (. . . $I_b$, $I_{offset}$, $I_a$, $I_b$, $I_{offset}$, $I_a$, . . . ), where $I_X$ denotes an image illuminated by light source x and $I_{offset}$ denotes an image having only ambient illumination.

However, the direct application of the ShadowFlash technique to the temporal domain raises two problems. First, the frame rate of the output sequence is reduced to $1/N_{in}$ accompanied with a $n_{light}$-frame delay in the beginning of the acquisition, because $N_{in}$ images are required to obtain one shadowless image as explained in Eqn. 1. Secondly, if any object in the scene moves during capture of a $N_{in}$-tuple, some artifacts will occur around the boundary of the object.

Figure 2A:
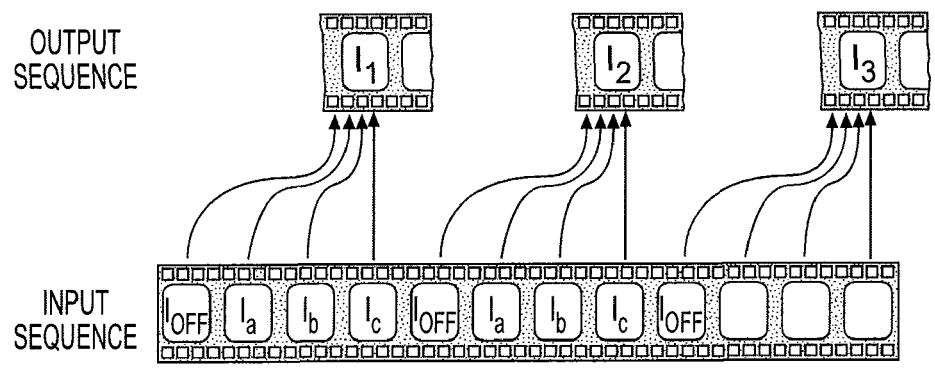
FIG. 2a is an example for a real-time ShadowFlash technique which is applied according to the present invention without the sliding N-tuple strategy.
Figure 2B:
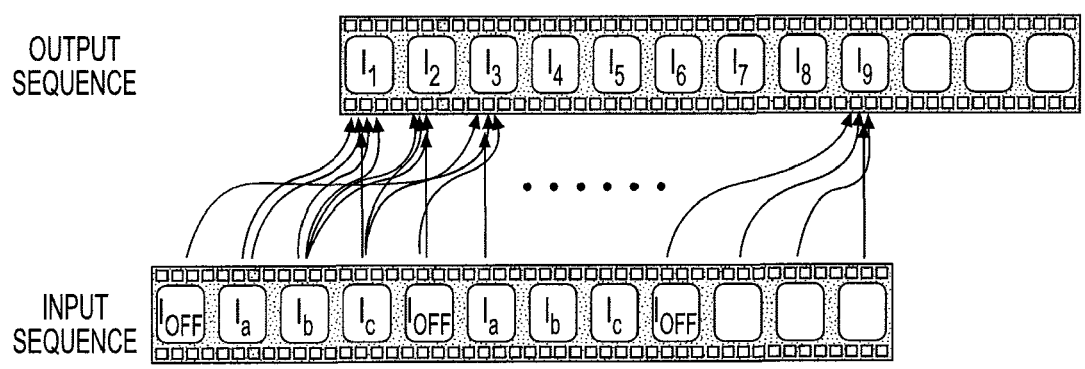
FIG. 2b is an example for a real-time ShadowFlash technique which is applied according to the present invention with the sliding N-tuple strategy.

In order to avoid the frame rate reduction, a sliding N-tuple strategy is employed. A memory window with the width of $N_{in}$ frames is created, whereby the window is moving along the time axis. Within this window, $N_{in}$ differently illuminated successive images are constantly refreshed. These images continuously form a set of inputs to create a shadowless output image. FIG. 2a clarifies that by employing a conventional N-tuple strategy the frame rate of the result sequence is divided by four, while by employing the sliding N-tuple strategy (cf FIG. 2b), the output frames are consecutively calculated.

Fast moving objects may distort the result of the sliding N-tuple strategy. The amount of distortion depends on the frame rate of the imager. When the imager produces frames with sufficient speed, the artifacts caused by moving objects should be negligible. In case of a slow frame rate compared to the velocity of moving objects within the scene, a supplementary algorithm should be implemented to detect and correct the difference between frames.

Figure 3A:
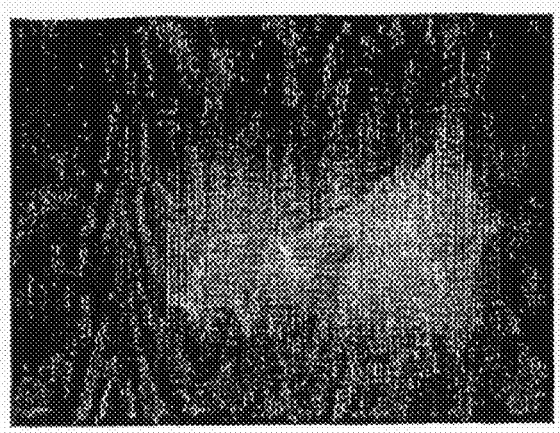
FIGS. 3a-d illustrate ShadowFlash and segmentation results for a sequence of images used for this test.
Figure 3B:
Figure 3C:
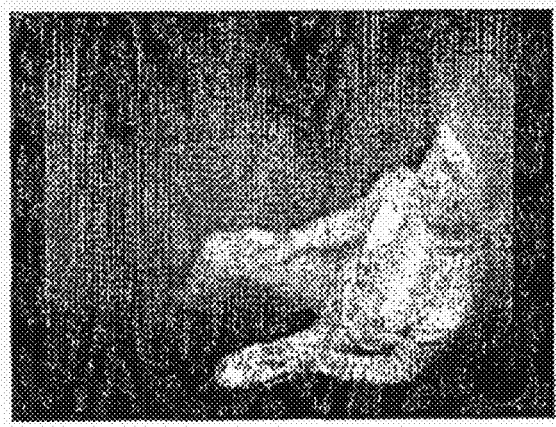
Figure 3D:
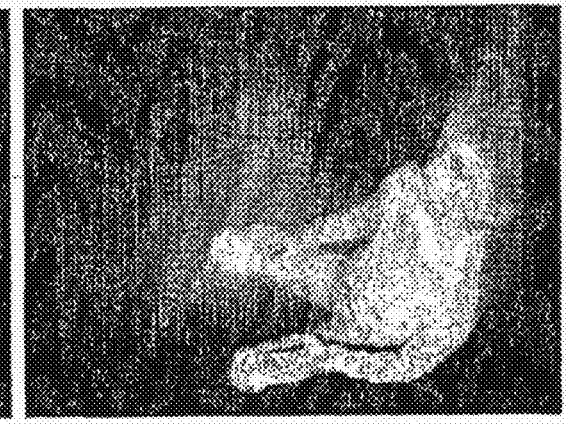
Figure 3E:
FIG. 3e illustrates ShadowFlash and segmentation results for a resulting ShadowFlash image.

An example result from the proposed extended Shadow-Flash method is shown in FIG. 3e. The figures FIG. 3a, FIG. 3b, FIG. 3c, and FIG. 3d show a sequence of images on which the shadowless image FIG. 3e is based: $I_{offset}$, $I_a$, $I_b$ and $I_c$, respectively.

In order to extract useful primary information from the available 2D image, a boundary extraction is performed. Once the segmentation process starts, the textural similarity of each frame against the reference background is analyzed by comparing the local variance. Since the local and global illumination changes are stabilized by the Double flash technique, and all the shadows are removed by ShadowFlash technique, a variance comparison followed by a simple adaptive thresholding is sufficient to provide an approximate boundary of the observed object.

Figure 3F:
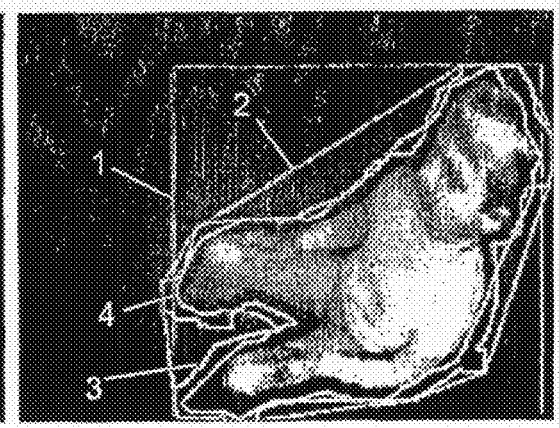
FIG. 3f illustrates ShadowFlash and segmentation results for a segmentation result applied to the ShadowFlash image.

An active contour model is employed to refine this approximate boundary. In order to provide an initial contour for the following snake evolution, a convex hull is generated around the approximate boundary. In this case, a sequence of the approximate boundary points exists normally between two consecutive convex hull vertices while each pair of the vertices forms a line segment. For each sequence, we can define depth as the maximum vertical distance between the sequence and the corresponding line segment. For example, the depth of a sequence adjacent/overlapped to the corresponding line segment is zero. Finally, the depth is used for weighting the energy function of each snake cell which belongs to the line segment providing the weight, so that the cell has higher mobility when it has a greater distance to the approximate boundary than other cells. A segmentation result applied to the shadowless ShadowFlash image FIG. 3e is shown in FIG. 3f (curve 1: bounding box, curve 2: convexhull, curve 3: approximate boundary and curve 4: snake result).

In order to provide three-dimensional information, the photometric stereo method is used.

Since the goal was to provide three-dimensional information without using a binocular imager, there were roughly three possibilities to consider as the surface recovery method. Structured lighting is a so-called active stereo vision method which calculates the three-dimensional shape of the object based on the deformation of the light patterns projected on the target surface. The calculations are simple and fast so that the shape of the scene could easily be extracted, provided that the feature points of the projected pattern are accurately detected. However, in reality, it is difficult to implement an accurate, pattern using an infrared light source due to the constant vibration in the vehicle environment. Furthermore, such patterns may not provide enough resolution for object classification.

Recently, a time-of-flight (TOF) imager, which consists of an array of single point distance measurement units measuring the runtime or phases of the emitted light from a supplementary light source, is of great interest in the industry. The TOF imager has a great advantage in that it directly measures the absolute depth and determines a complete distance map of the scene without any delay. Nevertheless, since the measurement range is limited by the amount of the maximum radiant power, the possibility of violating the eye safety still remains a problem to be solved.

The photometric stereo method (PSM) is an extended version of the shape from shading (SFS) method using multiple light sources, which constructs the relative depth of the object by using its reflection properties. Unlike the SFS, which suffers from the lack of sufficient information in an arbitrary irradiance image to reconstruct the object surface unambiguously, the PSM performs the surface recovery with greater ease, particularly when there are more than three light sources. Since multiple illumination sources and conditions are already employed for the ShadowFlash technique, it is simple to apply the PSM, for there is no need to provide supplementary hardware for such an implementation.

Abrupt movements of objects in-between two successive frames can be a problem of using the PSM method for certain applications. However, in the current application the typical amount of distortions caused by motion usually is acceptable. In addition, in case of low reconstruction performance a variation of the temporal rate of decisions and/or the spatial resolution of the scene and/or the frame rate of the imager can help.

The overall task of the PSM involves two major procedures: estimation of surface normals and integration of the object surface from the normal vectors. The estimation of the surface normal vector is performed albedo-independently by solving irradiance equations supported by a priori information about the direction and power of the illumination sources. Suitable methods are known, e.g., from R. Klette, K. Schluens, and A. Koschan: "Computer Vision, Three-Dimensional Data from Images." Springer, 1998, the entire content of which is herein expressly incorporated by reference.

The Frankot-Chellappa algorithm known from R. T. Frankot and R. Chellappa: "A method for enforcing integrability in shape from shading problem" IEEE Trans. on PAMI, 10(4):439-451, July 1988, the entire content of which is herein expressly incorporated by reference, based on minimizing integrability conditions in the frequency domain, is employed after a minor modification to improve its robustness for small artifacts caused by motion regardless of its disadvantage in time consumption.

Some typical surface recovery examples as well as the needle maps of their surface normals are shown in FIG. 4.

FIG. 4 shows the corresponding needle maps of the surface normals and their recovered 3D surfaces projected along the z-axis. The figures FIG. 4a, FIG. 4b, and FIG. 4c show needle maps superimposed on their original images, while the FIG. 4d, FIG. 4e, and FIG. 4f show surface reconstruction results with the spread axes.

In the following paragraphs the applied classification method and corresponding classification results are presented.

First, as a basis for the classification, features are to be defined and/or selected. Because there is no need for detecting an empty seat for a safety reason, the number of occupant types to be classified is limited to three: adult, forward-facing child seat (FFCS) and rear-facing childseat (RFCS). The definition of distinctive features invariant to any irrelevant transformations of input is an essential task to make the job of the classifier trivial.

According to an exemplary embodiment of the present invention, each feature is designed to specify at least one class vs. the other two classes (e.g. use of the occupant size in order to distinguish an adult from the childseat classes). The features are defined as follows:

Extended Gaussian Image (EGI): 4 Dimensions

The EGI is a histogram of the surface normals computed over a discretized Gaussian sphere. While the surface normals are effortlessly derived during the calculation in the PSM (see FIG. 4), it is expected that the rear-facing childseat should have a different aspect of its surface direction from the ones from the other two classes. The histogram is divided into bins of 90 degree each, and the number of the normal vectors belongs to each bin are calculated.

Surface Depth: 4 Dimensions

Figure 5A:
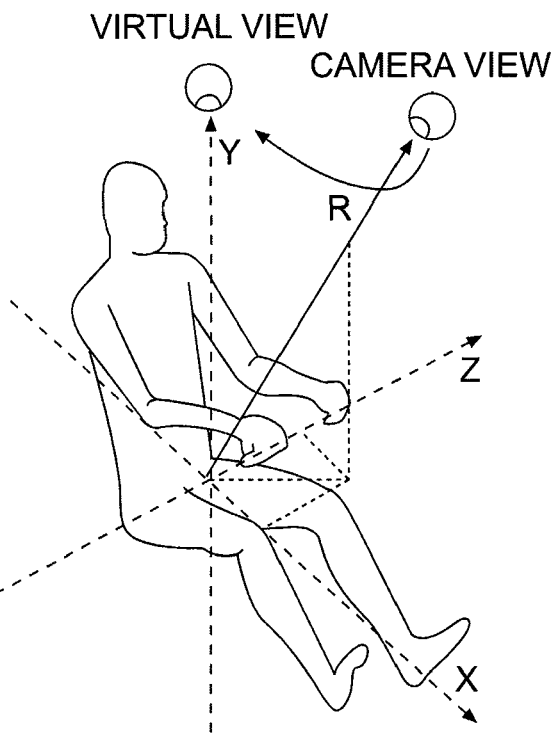
FIGS. 5a-5b illustrate coordinates, axes, and parameters for feature extraction according to the present invention.

The profile of the relative depth projected from the top of an object is also used as a feature. Since the camera coordinate system differs from the world coordinate system, a rotational transformation is performed with a given rotation matrix R representing three partial transformation (pan, tilt and roll angles) in order to provide a depth profile projected along the z-axis of the world coordinate system. A brief illustration of changing the view point is shown in FIG. 5a. The camera calibration provides the rotational matrix R with respect to the world coordinate origin. In principle, all the three-dimensional features are rotationally transformed in order to make them correctly viewed from the top.

Spread Axes Information: 9 Dimensions

Figure 5B:
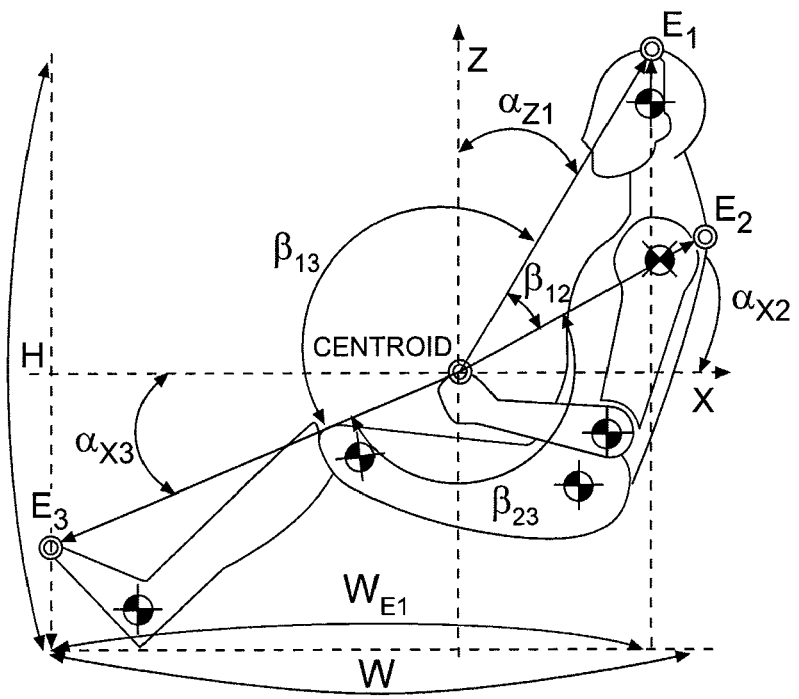

With the successful recovery of the object surface, three extrema ($E_1$, $E_2$ and $E_3$ as defined in FIG. 5b) on the surface are used for the definitions of a few useful features. In FIG. 5b the extrema $E_1$, $E_2$ and $E_3$ are defined as a most upper, most front (left) and most rear (right) point on the recovered surface, respectively. The spread axes are the lines between the center of gravity and the extrema. Accordingly, the spread angles ($\alpha_{X1}$, $\alpha_{X2}$ and $\alpha_{X3}$) are defined as the angles between the spread axes and the coordinate system; while the relative spread angles ($\beta_{12}$, $\beta_{13}$ and $\beta_{23}$) are the angles between the spread axes themselves. These two angle characteristics as well as the lengths of the spread axes are used as key features for the classifier. A few examples are shown in FIG. 4d, FIG. 4e, and FIG. 4f.

Relative Position of the Upper Extremum: 1 Dimension

The relative position of the upper extremum $E_1$ along the x-axis can be a good indicator for specifying the rear-facing childseat class against the other two classes. As shown in FIG. 5b, the relative position $P_{E1}$, is simply defined as $P_{E1}=W_{E1}/W$, where W and $W_{E1}$ denote the width of the object and the distance along the x-axis between the $E_1$ and $E_3$, respectively.

Volumetric Ratio and Compactness: 2 Dimensions

Since it is not possible to recognize what happens behind the object, it is difficult to define the volume of the object. Even if the assumption is made that the object has a flat back side, the volume of the target may still be extremely sensitive to the segmentation result. Consequently, the ratio of the three-dimensional surface area to the two-dimensional boundary area is defined as a volumetric ratio, which should increase as the volume of the object expands. Assuming a flat back side, the proportion, or compactness, of the object volume to a hexahedron enclosing the object could also provide robust estimation of its volume.

Other 2D Geometric Information: 9 Dimensions

Three low-order components of both normalized central moments and Hu moments are selected as features, along with the width, height and area of the object boundary.

The employed classifier operates as follows.

Figure 1B:
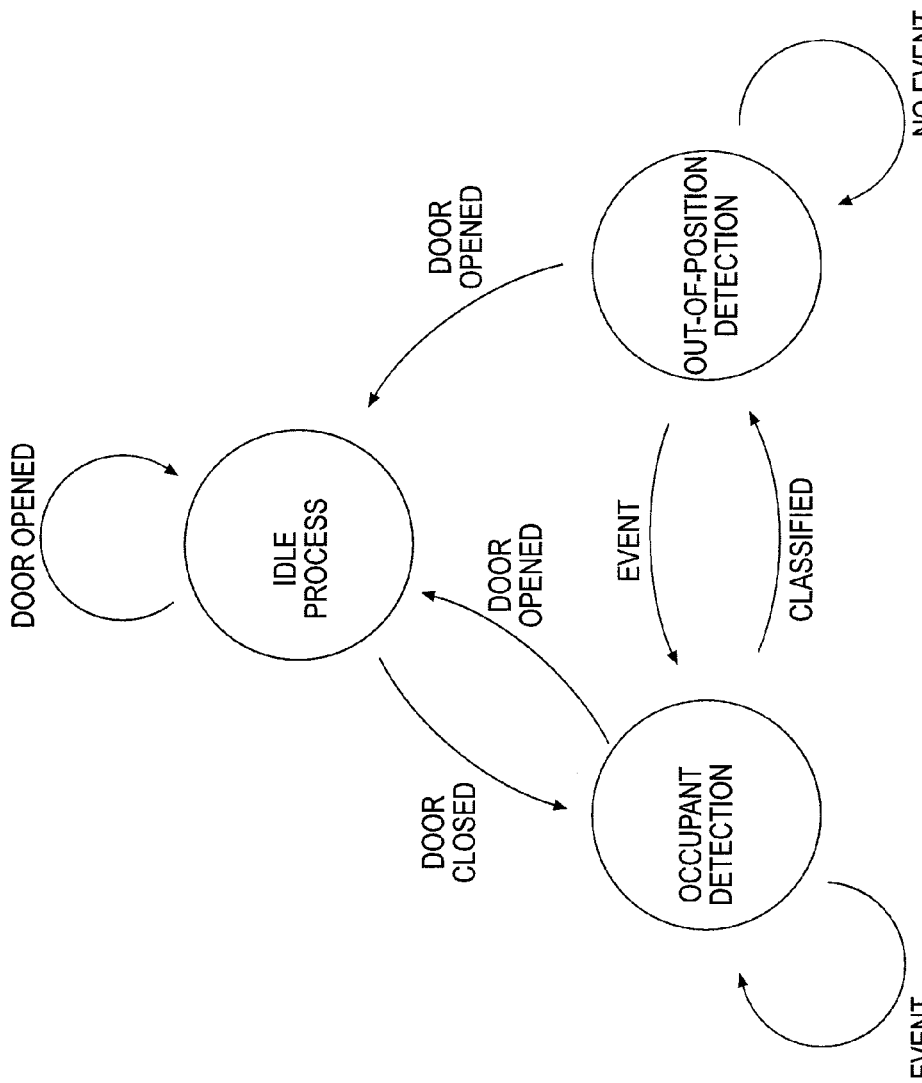
FIG. 1b is a system overview of a state transition diagram of the overall system.

Since a change of the occupant type is not likely during driving, the classification is, in most cases, enough to be performed once in the beginning of operation unless any dramatic change in the field of view occurs, cf. FIG. 1b. Hence, it is assumed that the proposed system must reach a decision within three seconds, which implies processing of 90 frames at the 30 Hz frame rate before making a final decision.

Figure 6A:
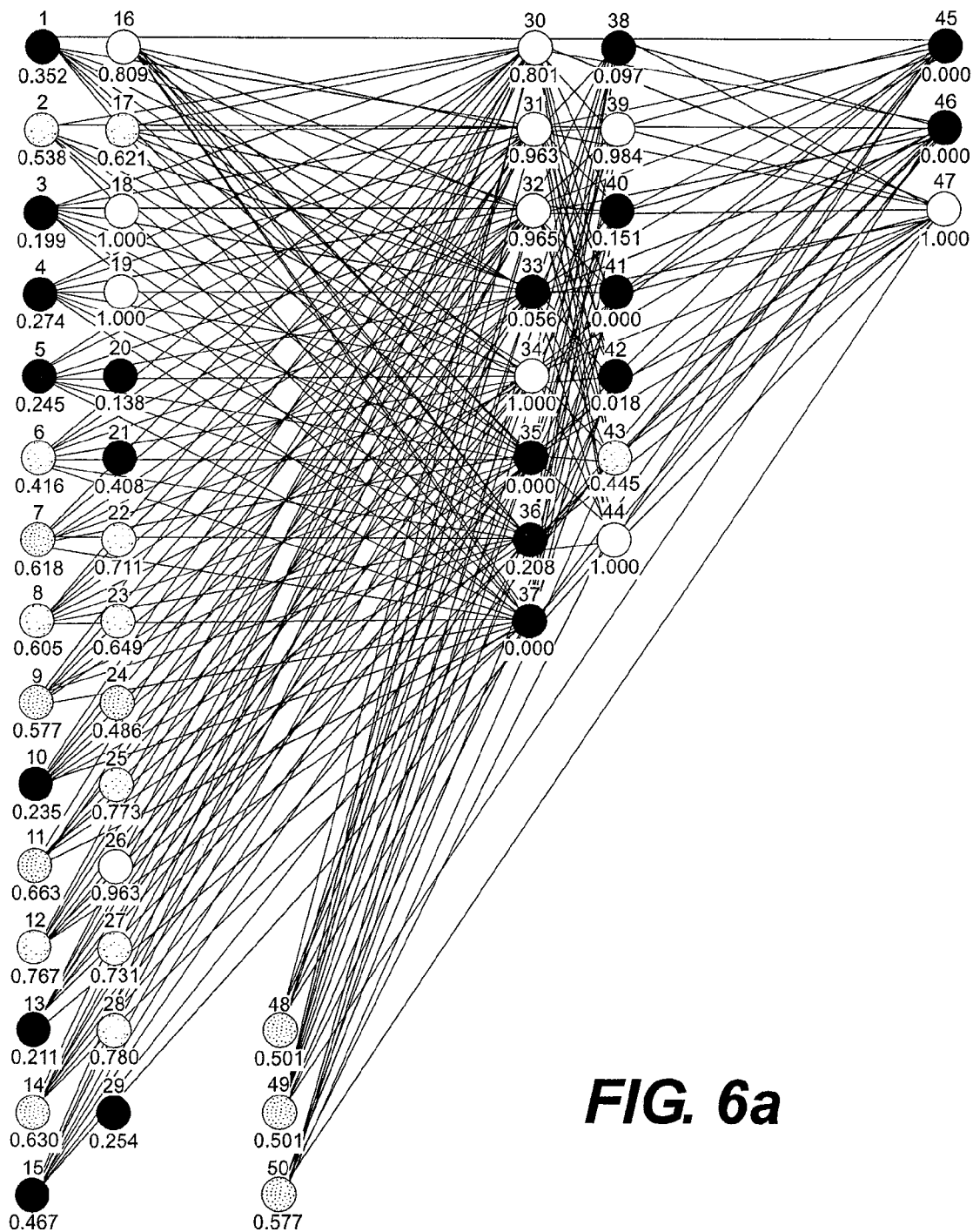
FIG. 6a illustrates a Jordan network after the learning process.
Figure 6B:
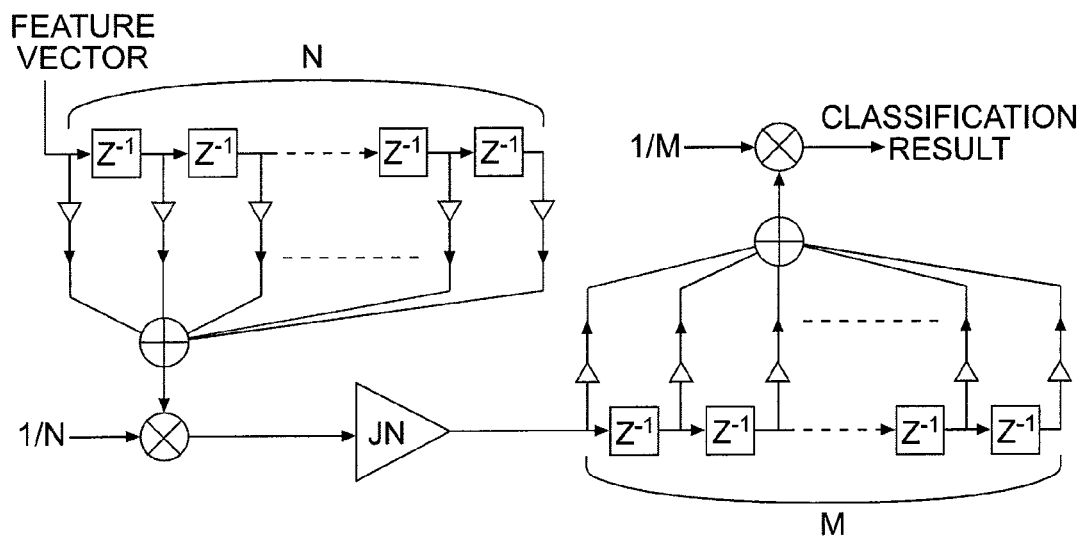
FIG. 6b illustrates the proposed classifier framework with two tapped delay lines.

Considering that these features do not reflect any dynamic properties of the passenger, it is necessary to construct a classifier model which is able to handle and classify temporal series. Trained in a supervised way, a partially recurrent network proposed by Jordan, e.g. known from M. I. Jordan: "Attractor dynamics and parallelism in a connectionist sequential machine", Proc. of the 8th annual conference of cognitive science society, pages 531-546, Amherst, Mass., the entire contents of which is herein expressly incorporated by reference, is employed with the support of two tapped delay lines, which are delay memories providing access to its contents at arbitrary intermediate delay length values. Each tapped delay line improves the accuracy of overall classification performance by filtering the noisy components in the stream of either feature vector (input) or classification result (output). The maximum delay length of the proposed system is limited to the 90 frames, allowing the system to monitor three seconds of the passenger history. The Jordan network after the learning process is shown in FIG. 6a while FIG. 6b presents the overall structure of the classifier module, i.e. the classifier framework with two tapped delay lines.

In order to clarify the performance, effectiveness, and robustness of a system and method according to the present invention, in the following paragraphs some results of experiments with the disclosed system and method are provided.

The system and method has been tested in experiments with 578 image sequences collected from 29 different childseats and 25 persons with 12-bit gray scale at 30 Hz. Lens distortions were eliminated using calibrated camera parameters. Additional objects such as blankets and different ambient illumination conditions were used to provide diversity. Finally, the sequences were evenly split into two groups creating a training and testing set, while the length of the sequences varied from 100 to 500 frames depending on the occupant's behavior, and the target output values were manually surveyed. The network was trained by the resilient backpropagation (Rprop) algorithm with the training set, while the regular logistic activation function was set to all the neurons and initial values at its synapses were randomly chosen. The learning was halted when the network reached the mean squared error of 0.0793 after 120 iterations.

Figure 6C:
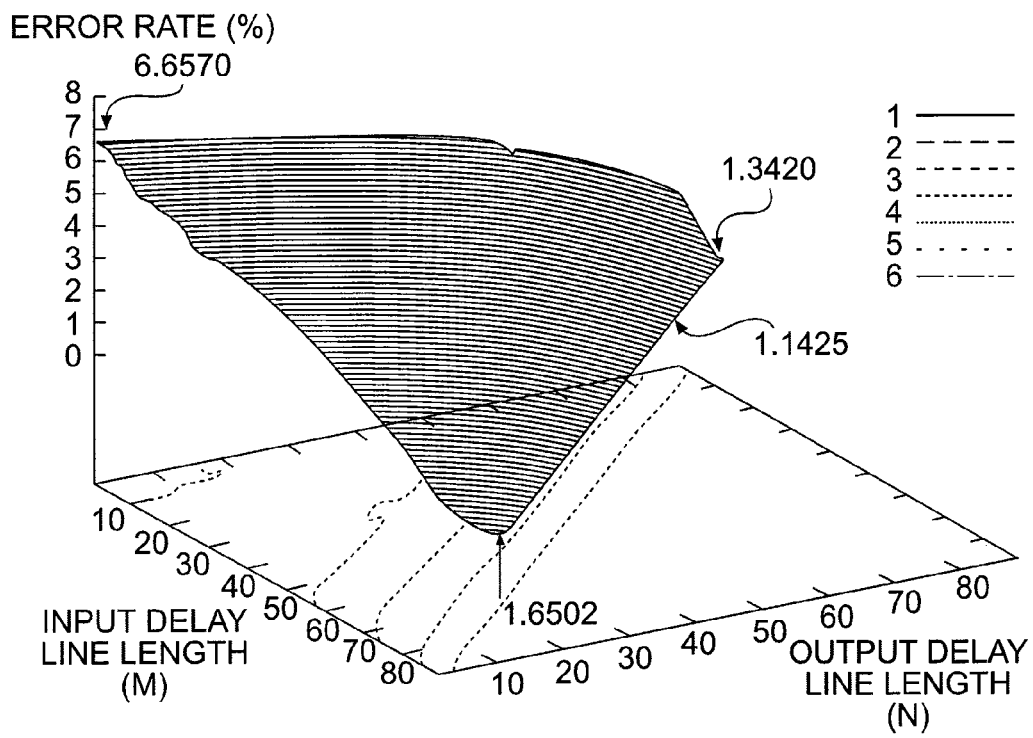
FIG. 6c illustrates the classification error space with respect to the length of delay lines.

Since the neural network only makes a single frame decision, the classification performance was evaluated with a test set according to the lengths of two tapped delay lines. FIG. 6c shows the classification error space with respect to the length of delay lines. FIG. 6c shows that the system is apparently more sensitive to the length of the output delay buffer due to the recurrent network's adaptability to sequential behavior. However, as the sizes of both delay lines increased, the difference of the sensitivity became negligible. Table 1 shows the intermediate error analysis according to the class types without the support of the tapped delay lines.

Table 1: Error statistics without the tapped delay lines (overall error rate: 6.66%).
Forward facing child seat (FFCS): Error rate 14.2%, Favorite error: RFCS (99.5%)
Rear facing child seat (RFCS): Error rate 15.4%, Favorite error: FFCS (90.0%)
Adult: Error rate 0.725%, Favorite error: RFCS (68.3%)

According to the intermediate analysis in Table 1 most errors occur between the FFCS and RFCS classes due to their similar characteristics of the two-dimensional geometry, especially when the scene is altered by additional objects (e.g. a baby holding a teddy bear in the RFCS covered by a blanket). Low error rate in the adult class was achieved even with test sequences involving large amounts of motion. These are encouraging results, as the misclassification between an adult and childseat generally poses greater danger than that of the misclassification between two childseats. After applying the tapped delay lines, the error rates of all classes were dramatically decreased as shown in Table 2.

Table 2: Error statistics with the tapped delay lines (overall error rate: 1.14%).
Forward facing child seat (FFCS): Error rate 10.1%, Favorite error: RFCS (100.0%)
Rear facing child seat (RFCS): Error rate 13.7%, Favorite error: FFCS (91.7%)
Adult: Error rate 0.0%

Although the original error rate of the ordinary Jordan network reaches 6.66%, cf. Table 1, a classification rate of 98.9% was achieved after setting the lengths of the input and output delay lines to 31 and 59, respectively.

The above results demonstrate the performance, effectiveness, and robustness of a system and method according to the present invention.

According to a preferred embodiment of the current invention the object on the vehicle seat is assigned to one out of at least two classes. This feature of the method does not necessarily have to be combined with other features of the method and/or a method characterized by this feature can be used independently of a device according to the present invention.

Thus, the present invention furthermore relates to a method of classifying an object detected on a vehicle seat, where the object is assigned to one out of at least two classes. According to an exemplary embodiment of the invention, the object is assigned to one out of at least two object classes, whereby the at least two object classes are selected from a plurality of object classes comprising the three following object classes: A child-seat arranged in forward driving direction, a child-seat arranged in backward driving direction, an adult. However, the classification itself does not necessarily have to be accomplished by means of a method and/or device according to the description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device that detects an object on a vehicle seat, comprising:
   a camera and a processing unit for the generation of a two-dimensional representation of the object;
   at least two illumination sources, which are positioned to illuminate the object from different directions,
   wherein the processing unit generates a three-dimensional representation of the object from two two-dimensional representations, each generated under different illumination conditions.

2. The device according to claim 1, wherein the processing unit generates a three-dimensional representation of the object from two two-dimensional representations, each generated under different illumination conditions, whereby the different illumination conditions are caused by a different number of active illumination sources.

3. The device according to claim 2, wherein the processing unit assigns the detected object to one out of at least two object classes, where the at least two object classes are selected from a plurality of object classes comprising the three following object classes:
   a child-seat arranged in forward driving direction,
   a child-seat arranged in backward driving direction,
   an adult.

4. The device according to claim 3, wherein the processing unit signals the object class to which the device on the vehicle seat has been assigned to a task which is either executed by the processing unit itself or by another device, whereby the fact and/or manner of the execution of this task depends on the object class to which the device on the vehicle seat has been assigned.

5. The device according to claim 1, wherein the processing unit assigns the detected object to one out of at least two object classes, where the at least two object classes are selected from a plurality of object classes comprising the three following object classes:
   a child-seat arranged in forward driving direction,
   a child-seat arranged in backward driving direction,
   an adult.

6. A method for detecting an object on a vehicle seat, the method comprising the acts of:
   illuminating the object by a first illumination device from a first direction;
   illuminating the object by a second illumination device from a second direction;
   generating a first two-dimensional representation of the object under a first illumination condition;
   generating a second two-dimensional representation of the object under a second illumination condition; and
   generating a three-dimensional representation of the object from the first and second two-dimensional representation.

7. The method of claim 6, wherein the first and second illumination conditions are caused by a different number of active illumination sources.

8. The method of claim 6, further comprising the act of:
   assigning the detected object to one out of at least two object classes, wherein the at least two object classes are selected from a plurality of object classes comprising the three following object classes:
   a child-seat arranged in forward driving direction,
   a child-seat arranged in backward driving direction,
   an adult.

* * * * *